(12) United States Patent
Kuehn et al.

(10) Patent No.: US 6,701,128 B2
(45) Date of Patent: Mar. 2, 2004

(54) TRANSMISSION SYSTEM

(75) Inventors: Arie Kuehn, Eindhoven (NL); Efthimios Tsilioukas, Grefrath (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 489 days.

(21) Appl. No.: 09/749,702

(22) Filed: Dec. 27, 2000

(65) Prior Publication Data

US 2001/0012762 A1 Aug. 9, 2001

(30) Foreign Application Priority Data

Jan. 10, 2000 (EP) .......................... 00200034

(51) Int. Cl.$^7$ ................................ H04Q 7/20
(52) U.S. Cl. .................. 455/63.1; 455/278.1; 455/501; 455/114.2
(58) Field of Search .............. 455/46, 501, 1, 455/63.1, 114.2, 278.1, 24, 39, 130, 217, 222, 334, 296, 67.13, 570, 277.2, 283

(56) References Cited

U.S. PATENT DOCUMENTS

| 5,887,032 A | | 3/1999 | Cioffi ................... 375/257 |
| 6,148,185 A | * | 11/2000 | Maruyama et al. ...... 455/115.1 |
| 6,529,495 B1 | * | 3/2003 | Aazhang et al. .......... 370/342 |

FOREIGN PATENT DOCUMENTS

| WO | 9740587 A1 | 10/1997 |
| WO | 9740608 A1 | 10/1997 |

OTHER PUBLICATIONS

ETSI Standard EN 300 744 V1.1.2 "Digital Video Broadcasting (DVB) ; Framing Structure, Channel Coding and Modulation for Digital Terrestrial Television".

* cited by examiner

Primary Examiner—CongVan Tran
(74) Attorney, Agent, or Firm—Laurie E. Gathman

(57) ABSTRACT

The transmission system according to the invention comprises a transmitter (10) and a receiver (12). The transmitter (10) can transmit a multicarrier signal (11) to the receiver (12). The receiver (12) comprises an interference absorption circuit (20), which interference absorption circuit (20) comprises interference detection means (26) for detecting interference components, e.g. impulsive noise components, included in the multicarrier signal (11) and interference removal means (28) for substantially removing the interference components from the multicarrier signal (11). The interference detection means (26) are arranged for generating and supplying to the interference removal means (28) an interference presence signal (27) which is indicative of the presence of the interference components in the multicarrier signal (11). The interference removal means (28) are arranged for substantially removing the interference components from the multicarrier signal (11) in dependence on the interference presence signal (27).

12 Claims, 4 Drawing Sheets

TRANSMISSION SYSTEM

BACKGROUND AND SUMMARY

The invention relates to a transmission system for transmitting a multicarrier signal from a transmitter to a receiver.

The invention further relates to a receiver for receiving a multicarrier signal from a transmitter, an interference absorption circuit for detecting interference components included in a multicarrier signal and for substantially removing the interference components from the multicarrier signal and to a method of detecting interference components included in a multicarrier signal and of substantially removing the interference components from the multicarrier signal.

A transmission system according to the preamble is known from the ETSI Standard EN 300 744 V1.1.2 entitled "Digital Video Broadcasting (DVB); Framing structure, channel coding and modulation for digital terrestrial television". Multicarrier transmission systems, such as systems employing Orthogonal Frequency Domain Multiplexing (OFDM), enable the transmission of data at a relatively high rate. OFDM, also known as Multicarrier Modulation (MCM) or Discrete MultiTone modulation (DMT), is a technique by which data is transmitted by modulating several low bit rate carriers in parallel, rather than one high bit rate carrier. OFDM is spectrally efficient, and has been shown to be effective for, for example, high performance digital radio links (such as in the Digital Audio Broadcast system). OFDM is also being used in Digital Subscriber Line systems, e.g. ADSL- or HDSL-systems, and in the DVB-T digital terrestrial television broadcast system as described in the above mentioned document.

Such transmission systems are vulnerable to parasitic signal components or interference components which enter the transmission system and which interfere with the desired multicarrier signal. For instance, in the case of the DVB-T transmission system, such interference components, e.g. impulsive noise or ingress noise components, can lead to a full or partial breakdown of the television picture and audio.

An object of the invention is to provide a transmission system for transmitting a multicarrier signal from a transmitter to a receiver, which transmission system is relatively insensitive to interference components. This object is achieved in the transmission system according to the invention, which is characterized in that the receiver comprises an interference absorption circuit for detecting interference components included in the multicarrier signal and for substantially removing the interference components from the multicarrier signal. The known transmission system doesn't have any provisions for detecting and removing interference components included in the multicarrier signal. By means of such an interference absorption circuit the undesired interference components can be detected and removed from the desired multicarrier signal.

An embodiment of the transmission system according to the invention is characterized in that the interference absorption circuit comprises a circuit input for receiving the multicarrier signal, interference detection means coupled to the circuit input for detecting interference components included in the multicarrier signal and interference removal means coupled to the circuit input for substantially removing the interference components from the multicarrier signal, an output of the interference detection means being coupled to an input of the interference removal means. The main functions of the interference absorption circuit, i.e. detection and removal of interference components, are efficiently implemented by the interference detection means and the interference removal means. The interference detection means and the interference removal means are coupled to each other so that the interference removal means can remove those interference components that have been detected by the interference detection means.

An embodiment of the transmission system according to the invention is characterized in that the interference detection means are arranged for generating and supplying to the output an interference presence signal indicative of the presence of the interference components in the multicarrier signal, the interference removal means being arranged for substantially removing the interference components from the multicarrier signal in dependence on the interference presence signal received at the input. By means of the interference presence signal which indicates the presence of the interference components in the multicarrier signal an effective coupling between the interference detection means and the interference removal means is achieved.

An embodiment of the transmission system according to the invention is characterized in that the interference detection means is arranged for generating the interference presence signal in dependence on the duration of the interference components. As, by this measure, the interference presence signal comprises information related to the duration of the individual interference components the interference removal means can accurately remove the interference components from the signal.

An embodiment of the transmission system according to the invention is characterized in that the interference detection means comprise timing means for generating the interference presence signal. By this measure the interference presence signal can be generated in an efficient and cost effective way.

An embodiment of the transmission system according to the invention is characterized in that the interference detection means further comprise an interference detector coupled to the timing means for detecting the interference components in the multicarrier signal, the timing means comprising a multiple triggerable pulse timer, the interference detector being arranged for generating and supplying to the timing means a number of trigger pulses, the number of trigger pulses being dependent on the duration of the interference components. By these measures a simple, efficient and cost-effective implementation of the interference detection means is obtained. Simple implementations of such an interference detector have been found based upon amplitude detection or slope detection. By triggering the multiple triggerable pulse timer a number of times in dependence on the duration of the individual interference components, the interference presence signal comprises information related to the duration of the individual interference components. Furthermore, multiple triggerable pulse timers are simple and inexpensive and are even available as standard electronic components.

An embodiment of the transmission system according to the invention is characterized in that the interference absorption circuit comprises a desensitizer for temporarily disabling the interference detection means and/or the interference removal means when a repetition rate of the interference components is too high. In this way multiple triggering is prevented under noisy conditions. Under these conditions a relatively large part of the multicarrier signal is removed by the interference removal means, leaving relatively little multicarrier signal content, which might cause an AGC in the receiver to increase the amplification of the multicarrier signal, which in turn leads to more interference components being detected and more parts of the multicarrier signal being removed, etc.

An embodiment of the transmission system according to the invention is characterized in that the interference detector comprise an amplitude detector for detecting the interference components in the multicarrier signal. An amplitude detector has proven to be a simple and effective implementation of an interference detector.

An embodiment of the transmission system according to the invention is characterized in that the amplitude detector comprises an Analog-to-Digital converter. Parts of the interference absorption circuit, e.g. the timing means and the interference removal means, can be implemented effectively in the digital domain, i.e. in digital hardware or as a program on a digital signal processor. In such a digital implementation the overflow signal of the Analog-to-Digital converter can be used to trigger the timing means.

An embodiment of the transmission system according to the invention is characterized in that the interference absorption circuit further comprises delay means for delaying the multicarrier signal, the interference removal means being coupled to the circuit input via the delay means, the delay introduced by the delay means being substantially equal to the delay introduced by the interference detection means. By this measure, any delay introduced by the interference detection means is compensated so that the interference presence signal is in phase with the multicarrier signal. Otherwise, i.e. if the interference presence were out of phase with the multicarrier signal, the removal of the interference components could not be accurately performed.

BRIEF DESCRIPTION OF THE DRAWINGS

The above object and features of the present invention will be more apparent from the following description of the preferred embodiments with reference to the drawings, wherein.

DETAILED DESCRIPTION

Figure 1:
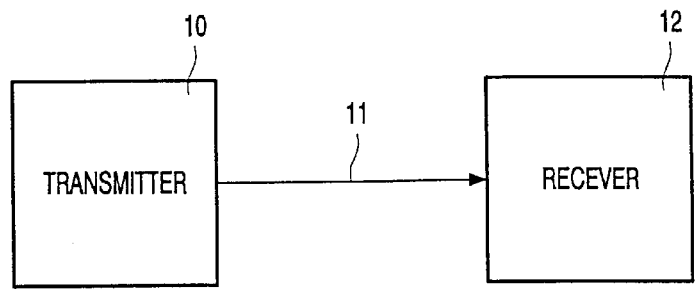
FIG. 1 shows a block diagram of an embodiment of a transmission system according to the invention.

FIG. 1 shows a block diagram of an embodiment of a transmission system according to the invention. In such a transmission system a multicarrier signal 11 is transmitted by a transmitter 10 to a receiver 12. The transmission system may comprise further transmitters 10 and receivers 12. The transmitters 10 and the receivers 12 can be of many different types depending on the particular application area. For example, in a Wireless Asynchronous Transfer Mode (WATM) system which supports high speed, short distance radio links between computer systems, a two-way radio communication link could be established between a personal computer and a printer. For this purpose, the personal computer and the printer are both equipped with a transmitter 10 and a receiver 12. Alternatively, in a radio broadcast system, e.g. a Digital Audio Broadcast (DAB)-system, the transmitter 10 could be part of a radio broadcast station, while the receiver 12 could be included in a car radio. In a DVB-T digital terrestrial television system the transmitter 10 could be part of television broadcast station, while the receiver 12 could be a television receiver or a set-top box.

The receiver 12 comprises an interference absorption circuit (not shown) for detecting interference components included in the multicarrier signal 11 and for substantially removing, during a time interval the interference components from the multicarrier signal 11.

Figure 2A:
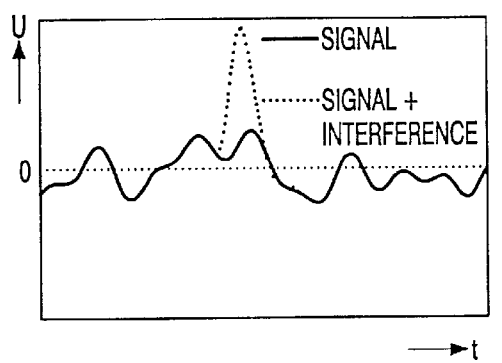
FIGS. 2A and 2B show some waveforms which illustrate the operation of an interference absorption circuit according to the invention.
Figure 2B:
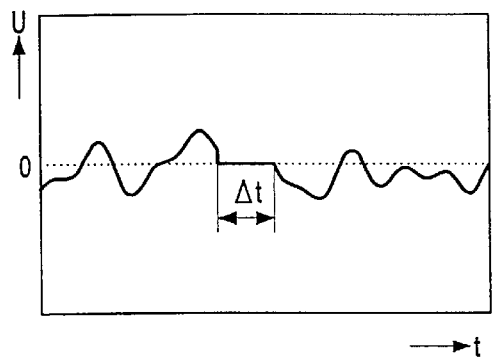

FIGS. 2A and 2B show some waveforms which illustrate the operation of an interference absorption circuit according to the invention. In FIG. 2A a desired multicarrier signal with superimposed thereon an interference component (an impulsive noise component) is shown. This multicarrier signal is input to an interference absorption circuit which detects the interference component and removes it from the desired multicarrier signal, e.g. by setting the multicarrier signal to zero (mute) during a time interval Δt or by keeping the desired multicarrier signal at a constant level (sample and hold) during a time interval Δt. The result of partly muting the multicarrier signal is shown in FIG. 2B. The interference absorption circuit is arranged for adapting the time interval Δt in dependence on the duration of the individual interference components. Preferably, the time interval Δt is substantially equal to the duration of the individual interference components so that a near perfect removal of the interference components is achieved.

Figure 3:
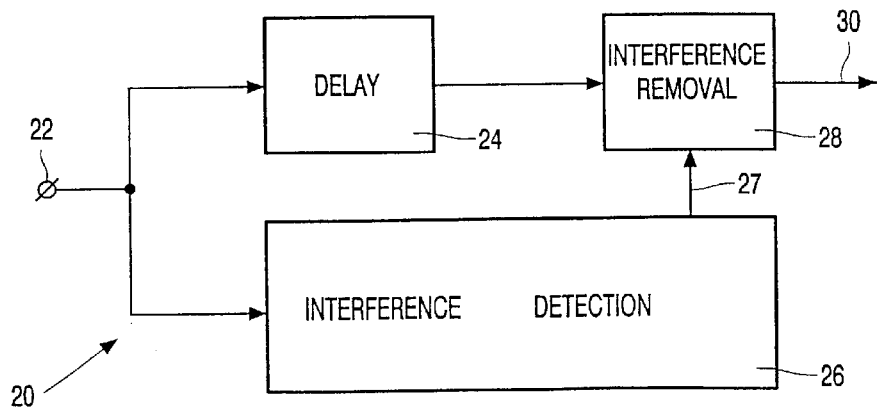
FIG. 3 shows a block diagram of an embodiment of an interference absorption circuit according to the invention.

FIG. 3 shows a block diagram of an embodiment of an interference absorption circuit 20 according to the invention. The interference absorption circuit 20 comprises a circuit input 22 for receiving the multicarrier signal 11, interference detection means 26 coupled to the circuit input 22 for detecting the interference components included in the multicarrier signal 11, interference removal means 28 coupled via delay means 24 to the circuit input 22 for substantially removing the interference components from the multicarrier signal 11 and a circuit output 30 for supplying the 'cleaned-up' multicarrier signal. An output of the interference detection means 26 is coupled to an input of the interference removal means 28. The interference detection means 26 generates an interference presence signal 27 which is indicative of the presence of the interference components in the multicarrier signal 11. This interference presence signal 27 is supplied by the interference detection means 26 to the interference removal means 28. The interference removal means 28 uses the interference presence signal 27 to substantially remove the interference components from the multicarrier signal 11.

The delay means 24 can be used in the interference absorption circuit 20 for delaying the multicarrier signal 11 in order to compensate for any delay introduced by the interference detection means 26. If the interference detection means 26 does not introduce a significant delay, the delay means 24 may be omitted.

Figure 4:
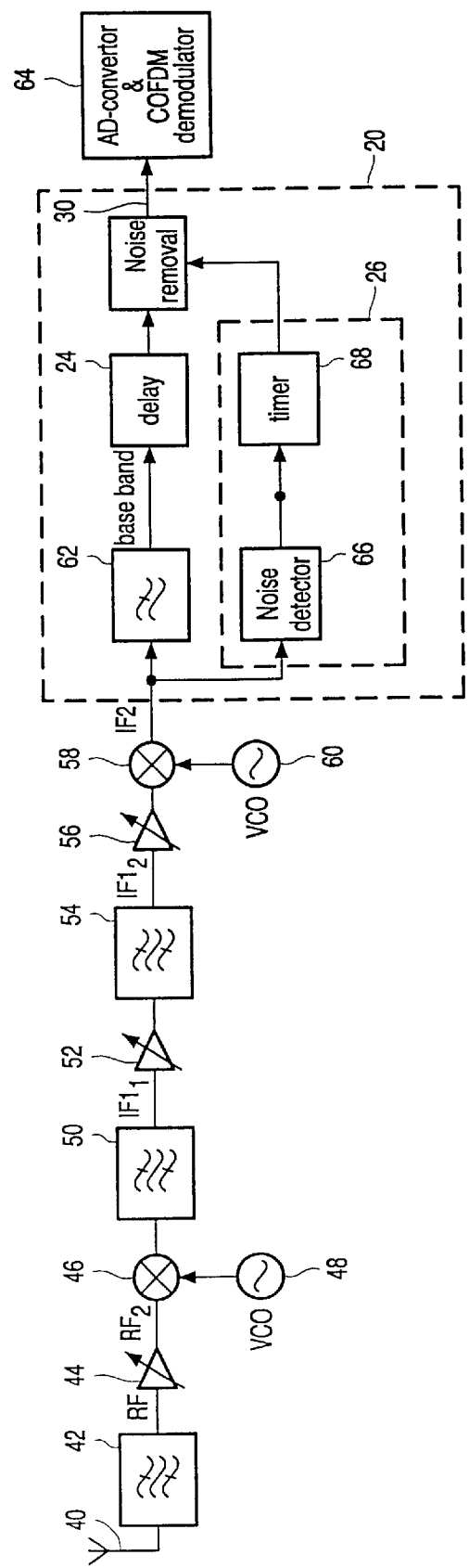
FIG. 4 shows a block diagram of a receiver according to the invention.

FIG. 4 shows a block diagram of a receiver according to the invention. The receiver shown is a DVB-T receiver. This receiver receives a RF-signal via an antenna 40 which is coupled to a band-pass filter 42. This band-pass filter 42 provides a desired RF-selectivity. The output of the band-pass filter 42 is coupled via an AGC 44 to a mixer 46. This mixer 46 is also coupled to an oscillator 48 and uses the oscillation signal to perform a frequency down conversion of the output signal of the AGC 44. Next, the output signal of the mixer 46 is supplied via a further band-pass filter 50 to a further AGC 52. This AGC 52 is coupled to yet another band-pass filter 54. Preferably, the band-pass filters 50 and 54 are SAW filters. The output of the band-pass filter 54 is coupled via an AGC 56 to a mixer 58. This mixer 58 is also coupled to an oscillator 60 and uses the oscillation signal to perform a frequency down conversion of the output signal of the AGC 56.

The output multicarrier signal 11 of the mixer 58 is input to the interference absorption circuit 20. This interference absorption circuit 20 comprises, in addition to the components already shown and discussed in relation to FIG. 3, a low-pass anti-aliasing filter 62 which is connected between the circuit input 22 and the delay means 24. The interference detection means 26 comprise an interference detector 66 for detecting the interference components in the multicarrier signal 11 and coupled thereto timing means 68 for generating the interference presence signal 27. The interference detector 66 generates a number of trigger pulses, the number of trigger pulses being dependent on the duration of the interference components. These trigger pulses are supplied by the interference detector 66 to the timing means 68. The timing means 68 comprise a multiple triggerable pulse timer for generating the interference presence signal 27 in dependence on the number of trigger pulses received from the interference detector 66.

The output 30 of the interference absorption circuit 20 is coupled to a receiver back-end part which comprises an AD-converter and a COFDM-demodulator. The AD-converter converts the 'cleaned-up' analog output signal 30 of the interference absorption circuit 20 into a digital signal which is demodulated by means of the COFDM-demodulator.

Figure 5:
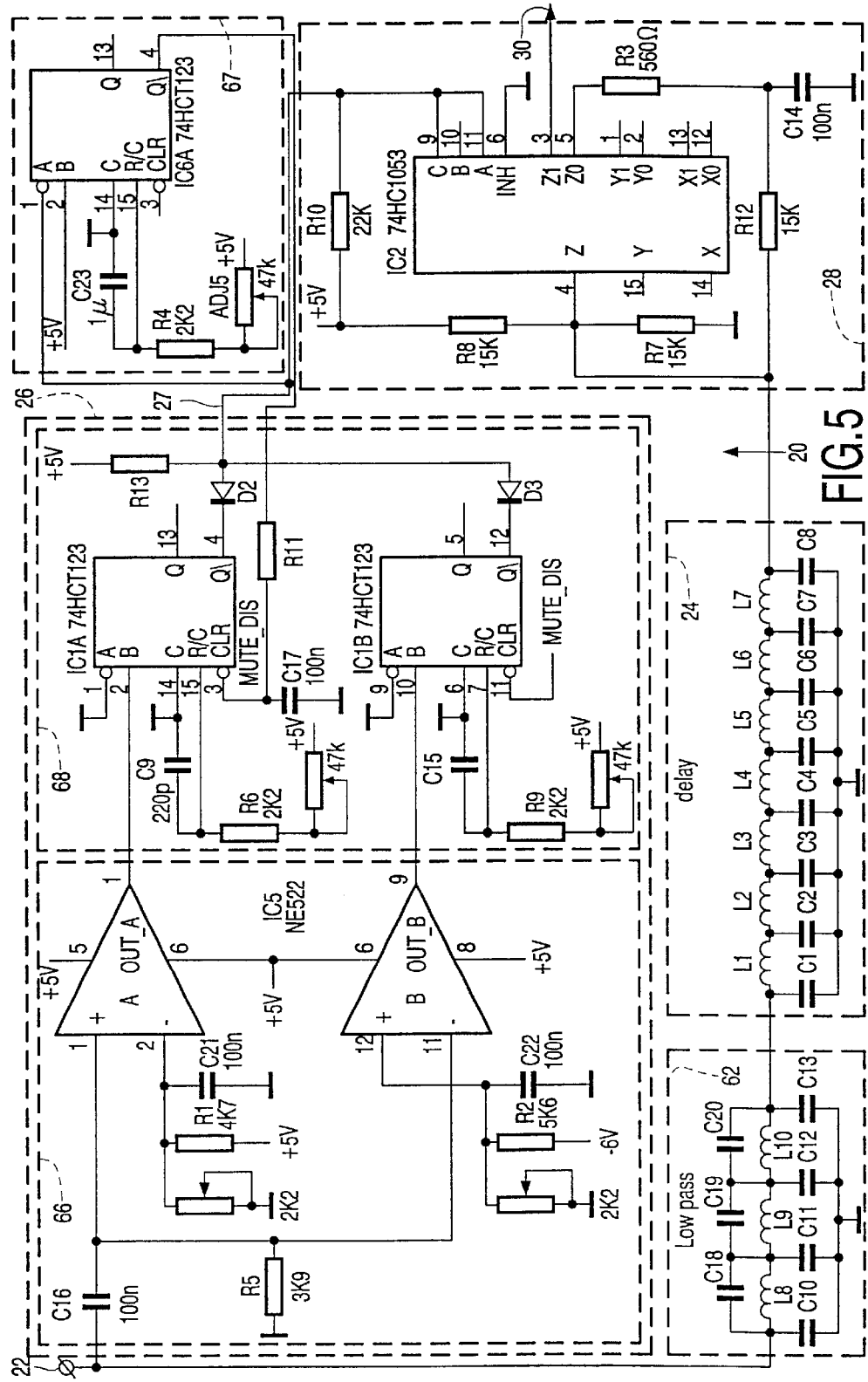
FIG. 5 shows an electrical diagram of an embodiment of an interference absorption circuit according to the invention.

FIG. 5 shows an electrical diagram of an embodiment of an interference absorption circuit 20 according to the invention for use in a receiver as shown in FIG. 4. The interference detector 66 is an amplitude detector which comprises two voltage comparators A and B (e.g. as provided in the integrated circuit NE522). The voltage comparator A detects interference components included in the multicarrier signal 11 which exceed a positive voltage threshold. This positive voltage threshold is set by an adjustable voltage divider connected to input 2 of the voltage comparator A. The voltage comparator B detects interference components included in the multicarrier signal 11 which exceed a negative voltage threshold. This negative voltage threshold is set by another adjustable voltage divider which is connected to input 12 of the voltage comparator B. Alternatively, the amplitude detector may comprise a rectifier and a single voltage comparator which detects interference components exceeding a positive voltage threshold.

The multicarrier signal 11, which enters the interference absorption circuit 20 via the circuit input 22, is fed into the voltage comparators A and B via a capacitor C16. This capacitor C16 blocks DC components which may be included in the multicarrier signal 11.

The timing means 68 comprise two multiple triggerable pulse timers IC1A and IC1B (such as included in the Philips' 74HCT123 integrated circuit). An input of timer IC1A is coupled to an output of the voltage comparator A and in input of timer IC1B is coupled to an output of the voltage comparator B. When an interference component exceeding the positive voltage threshold is detected by the voltage comparator A, timer IC1A is triggered for a period of e.g. 500 ns. When an interference component exceeding the negative voltage threshold is detected by the voltage comparator B, timer IC1B is also triggered for a period of e.g. 500 ns. An output 4 of timer IC1A and an output 12 of timer IC1B are coupled to each other via diodes D2 and D3. These diodes D2 and D3 form an AND-gate so that the output signals of the timers IC1A and IC1B are combined in the interference presence signal 27 such that the interference presence signal 27 has a low voltage during the times that the timers IC1A and/or IC1B are triggered.

The interference removal means 28 comprise an analog switch IC2 (such as included in the Philips' 74HCT4053 integrated circuit) for muting the multicarrier signal 11, which was first fed into a low-pass anti-aliasing filter 62 and a delay circuit 24. Normally the multicarrier signal 11, which is supplied to the analog switch IC2 at input Z, is passed by the analog switch IC2 via output Z1 to the circuit output 30. When the interference presence signal 27 has a low voltage (i.e. during the times that the timers IC1A and/or IC1B are triggered by the interference detector 66) the multicarrier signal 11 is passed to output Z0. This effectively mutes the multicarrier signal at the circuit output 30. Alternatively, in stead of muting, the multicarrier signal 11 may be sampled and kept at a constant level by a sample and hold circuit or component in order to remove the interference components.

The interference absorption circuit 20 comprises a desensitizer 67 for temporarily disabling the interference detection means 26 when a repetition rate of the interference components is too high. The desensitizer 67 may comprise a multiple triggerable pulse timer IC6A (such as included in the Philips' 74HCT123 integrated circuit). The interference presence signal 27 is supplied to an input A of this timer IC6A. When the interference presence signal 27 has a low voltage the timer IC6A is triggered and the signal at output Q\ of the timer IC6A has a low voltage for a period of time that is defined by the combination of capacitor C23, resistor R4 and variable resistor ADJ5. The output Q\ of the timer IC6A is coupled via an RC-low-pass filter (formed by resistor R11 and capacitor C17) to the timers IC1A and IC1B. The signal at output Q\ is smoothed by the RC-filter so that it decreases when the repetition rate of interference presence signal 27 increases. After some threshold (adjusted by ADJ5) is exceeded the timers IC1A and IC1B of the interference detection means 26 are disabled and stop triggering. This ensures that the interference absorption circuit 20 will not hang after an excessive noise attack. Alternatively, the desensitizer 67 may (also) disable the interference removal means in order to ensure the correct operation of the interference absorption circuit 20 under such extreme conditions.

Figure 6A:
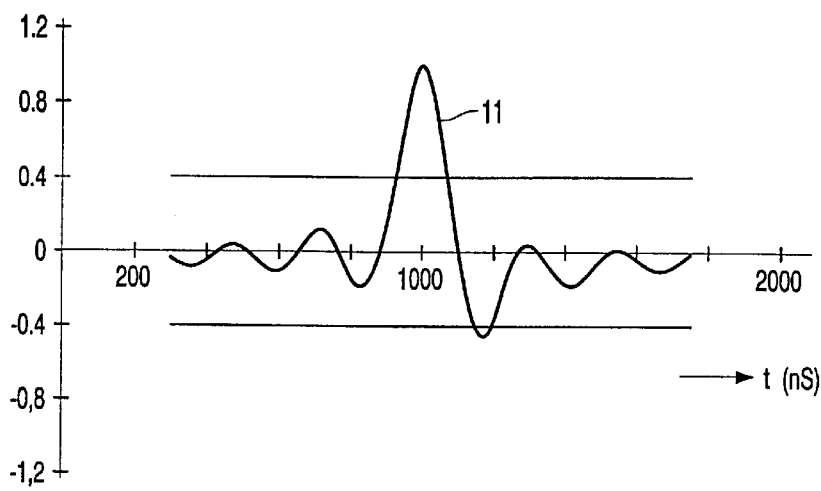
FIGS. 6A to 6E show some waveforms which illustrate the operation of the interference absorption circuit as shown in FIG. 5, In the Figures, identical parts are provided with the same reference numbers.

FIGS. 6A to 6E show some waveforms which illustrate the operation of the interference absorption circuit as shown in FIG. 5. FIG. 6A illustrates the operation of the interference detector 66. The positive threshold of the voltage comparator A and the negative threshold of the voltage comparator B are respectively indicated as the horizontal lines at y=+0.4 and y=−0.4. The voltage comparator A detects interference components included in the multicarrier signal 11 which exceed the positive voltage threshold. When such an interference component is detected by the voltage comparator A, timer IC1A is triggered for a period of e.g. 500 ns. FIG. 6A shows that the voltage comparator A detects an interference component at t≈920 ns . As a consequence, timer IC1A is triggered and the signal at output 4 of timer IC1A has a low voltage for 500 ns (see FIG. 6B which shows the signal at output 4 of timer IC1A). The voltage comparator B detects interference components included in the multicarrier signal 11 which exceed the negative voltage threshold. When such an interference component is detected by the voltage comparator B, timer IC1B is triggered for a period of e.g. 500 ns. FIG. 6A shows that the voltage comparator B detects an interference component at t≈1120 ns. As a consequence, timer IC1B is triggered and the signal at output 12 of timer IC1B has a low voltage for 500 ns (see FIG. 6C which shows the signal at output 12 of timer IC1B).

Figure 6B:
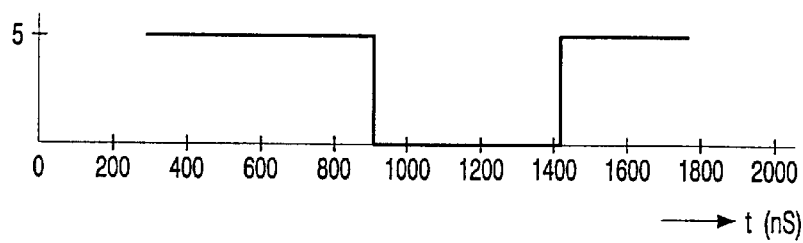
Figure 6C:
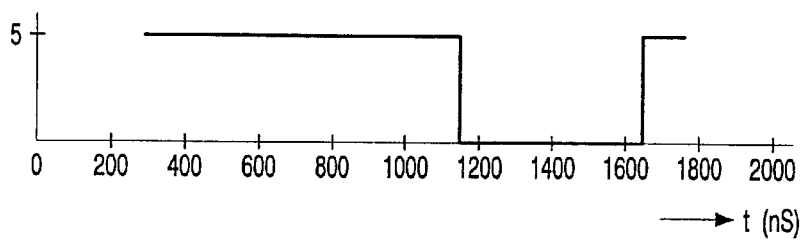
Figure 6D:
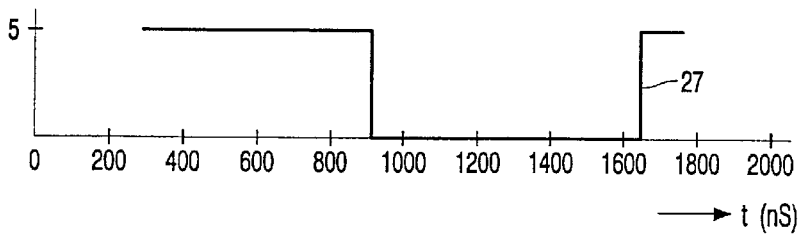
Figure 6E:
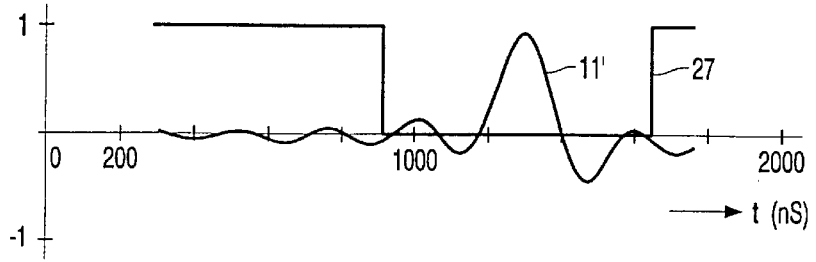

The output signals of the timers IC1A and IC1B as shown in FIGS. 6B and 6C, respectively, are combined by an AND-gate (diodes D2 and D3) in the interference presence signal 27 (see FIG. 6D). FIG. 6E shows multicarrier signal 11', which is the multicarrier signal 11 as filtered and delayed by the anti-aliasing filter 62 and the delay line 24, and the interference presence signal 27. Due to the operation of the analog switch IC2 the multicarrier signal 11' is muted from t≈920 ns until t≈1620 ns.

The scope of the invention is not limited to the embodiments shown. The invention is embodied in each new characteristic and each combination of characteristics. Any reference signs do not limit the scope of the claims. The word "comprising" does not exclude the presence of elements or steps other than those listed in a claim. Use of the word "a" or "an" preceding an element does not exclude the presence of a plurality of such elements.

What is claimed is:

1. A transmission system for transmitting a multicarrier signal from a transmitter to a receiver, characterized in that the receiver comprises an interference absorption circuit for detecting interference components included in the multicarrier signal and for substantially removing the interference components from the multicarrier signal, wherein the interference absorption circuit comprises a circuit input for receiving the multicarrier signal, interference detection means coupled to the circuit input for detecting interference components included in the multicarrier signal and interference removal means coupled to the circuit input for substantially removing the interference components from the multicarrier signal, an output of the interference detection means being coupled to an input of the interference removal means.

2. A transmission system according to claim 1, characterized in that the interference detection means are arranged for generating and supplying to the output an interference presence signal indicative of the presence of the interference components in the multicarrier signal, the interference removal means being arranged for substantially removing the interference components from the multicarrier signal in dependence on the interference presence signal received at the input.

3. A transmission system according to claim 1, characterized in that the interference detection means is arranged for generating the interference presence signal in dependence on the duration of the interference components.

4. A transmission system according to claim 1, characterized in that the interference detection means comprise timing means for generating the interference presence signal.

5. A transmission system according to claim 4, characterized in that the interference detection means further comprise an interference detector coupled to the timing means for detecting the interference components in the multicarrier signal, the timing means comprising a multiple triggerable pulse timer, the interference detector being arranged for generating and supplying to the timing means a number of trigger pulses, the number of trigger pulses being dependent on the duration of the interference components.

6. A transmission system according to claim 5, characterized in that the interference absorption circuit comprises a desensitizer for temporarily disabling the interference detection means (26) and/or the interference removal means when a repetition rate of the interference components is too high.

7. A transmission system according to claim 5, characterized in that the interference detector comprise an amplitude detector for detecting the interference components in the multicarrier signal.

8. A transmission system according to claim 7, characterized in that the amplitude detector comprises an Analog-to-Digital converter.

9. A transmission system according to 1, characterized in that the interference absorption circuit further comprises delay means for delaying the multicarrier signal (11), the interference removal means being coupled to the circuit input via the delay means, the delay introduced by the delay means being substantially equal to the delay introduced by the interference detection means.

10. A receiver for receiving a multicarrier signal from a transmitter, characterized in that the receiver comprises an interference absorption circuit for detecting interference components included in the multicarrier signal and for substantially removing the interference components from the multicarrier signal, wherein the interference absorption circuit comprises a circuit input for receiving the multicarrier signal, interference detection means coupled to the circuit input for detecting interference components included in the multicarrier signal and interference removal means coupled to the circuit input for substantially removing the interference components from the multicarrier signal, an ouptut of the interference detection means being coupled to an input of the interference removal means.

11. An interference absorption circuit for detecting interference components included in a multicarrier signal and for substantially removing the interference components from the multicarrier signal, wherein the interference absorption circuit comprises a circuit input for receiving the multicarrier signal, interference detection means coupled to the circuit input for detecting interference components included in the multicarrier signal and interference removal means coupled to the circuit input for substantially removing the interference components from the multicarrier signal, an output of the interference detection means being coupled to an input of the interference removal means.

12. A method of detecting interference components included in a multicarrier signal and of substantially removing the interference components from the multicarrier signal, wherein the interference absorption circuit comprises a circuit input for receiving the multicarrier signal, interference detection means coupled to the circuit input for detecting interference components included in the multicarrier signal and interference removal means coupled to the circuit input for substantially removing the interference cmponents from the multicarrier signal, an output of the interference detection means being coupled to an input of the interference removal means.

* * * * *